Patented Nov. 28, 1922.

1,436,770

UNITED STATES PATENT OFFICE.

BERTRAM MAYER, WILHELM MOSER, AND JAKOB WÜRGLER, OF BASEL, SWITZERLAND, ASSIGNORS TO SOCIETY OF CHEMICAL INDUSTRY IN BASLE, OF BASEL, SWITZERLAND.

VAT DYESTUFF DERIVED FROM ANTHRAQUINONE AND PROCESS OF MAKING SAME.

No Drawing.   Application filed February 1, 1922.   Serial No. 533,352.

*To all whom it may concern:*

Be it known that we, BERTRAM MAYER, citizen of the German Republic, WILHELM MOSER, citizen of the German Republic, and JAKOB WÜRGLER, citizen of the Swiss Republic, all three residents of Basel, Switzerland, have invented new and useful Vat Dyestuffs Derived from Anthraquinone and Processes of Making Same, of which the following is a full, clear, and exact specification.

We have found that by reacting with the derivatives of betanaphthoquinone, containing removable substituents, as for instance a halogen or a group sulfo, on alpha-aminoanthraquinones or alpha-alpha-diaminoanthraquinones, there are obtained easily new products whose principal types correspond to the following formulas:

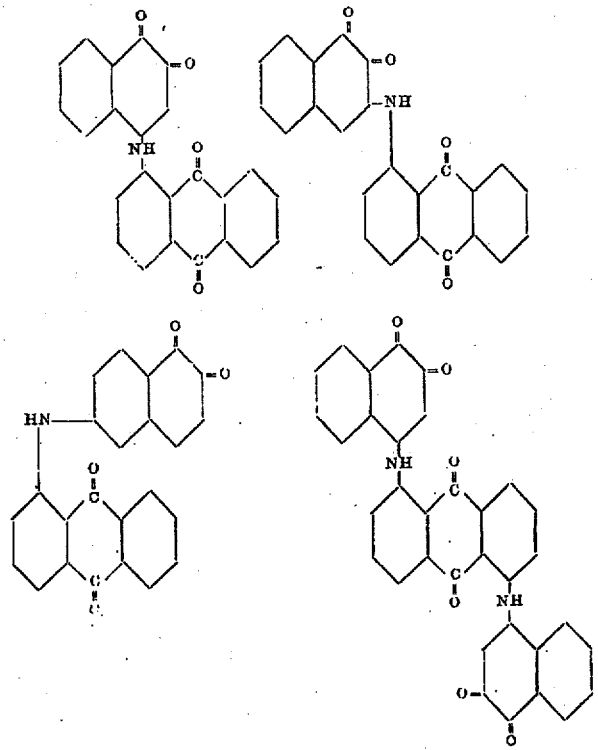

These bodies are dark-brown powders giving with hydrosulfite and caustic soda vats having only a feeble affinity for vegetable fibres. Their industrial value lies in the fact that they can be condensed easily with ortho-diamino-anthraquinones to vat-dyestuffs the constitution whereof is characterized by the presence of at least one anthraquinone - alphabeta - naphthazine complex united by a >N—H group to an anthraquinone nucleus which can bear other substituents, one of the nitrogen valences of the >N—H groups being fixed in any position to the naphthalene nucleus of the anthraquinone-alphabeta-naphthazines and the other to one of the alpha positions of the second anthraquinone nucleus, as shown by the following formulas illustrating particular cases of our invention.

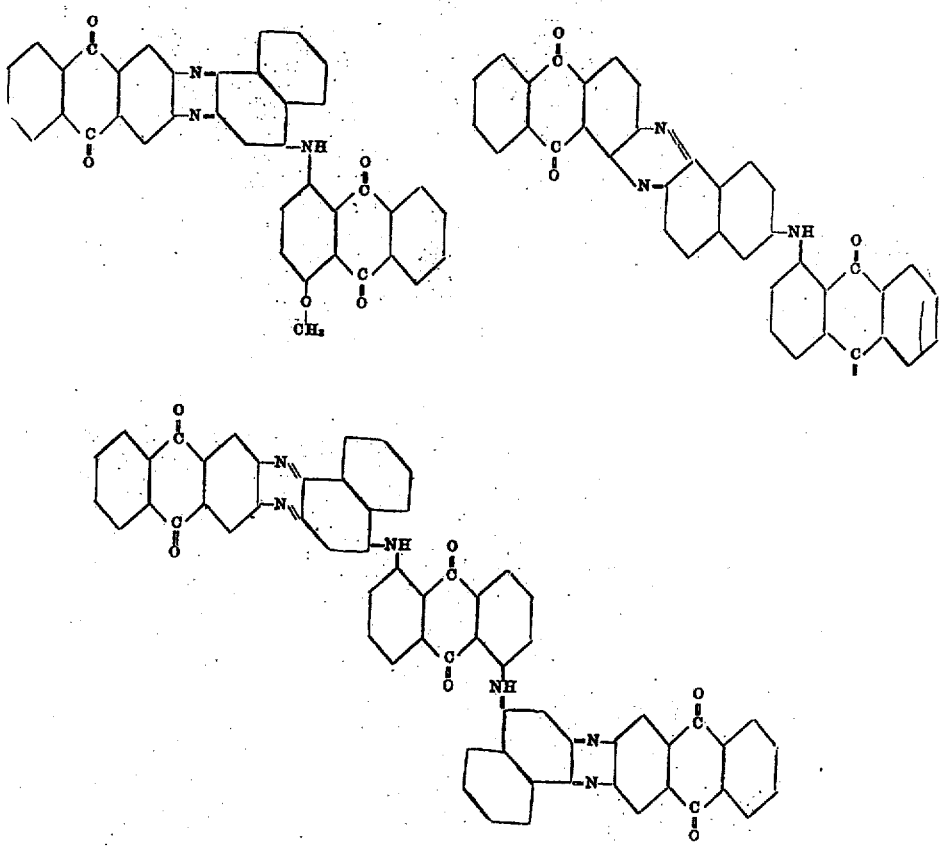

These new vat dyestuffs are in a dry state, more or less dark red powders. They are insoluble in water and dissolve in sulfuric acid to a green coloration. With caustic alkali and hydrosulfite they give reddish-brown vats by means of which cotton can be dyed red to violet tints of great fastness.

The invention is illustrated by the following examples:

*Example 1.*

A mixture of 20 parts of alpha-amino-anthraquinone, 40 parts of the potassium salt of the betanaphthoquinone-4-sulfonic acid and 100 parts of glacial acetic acid is boiled for half an hour in a vessel provided with a reflux cooler and a stirrer, then 60 parts of hot water are added and the whole is still boiled for a few moments. After filtration the residue is washed with water until complete disappearance of acetic acid and dried. There is thus obtained a brown-red powder which dissolves difficultly in toluene and xylene, more easily in nitrobenzene. From its solution in nitrobenzene the product can be obtained crystallized in the form of fine brown-red needles. It dissolves in concentrated sulfuric acid to a yellow-brown solution; by diluting this solution with water, there is produced a red flocky precipitate. With hydrosulfite and caustic soda it gives a red vat showing a very feeble affinity for cotton.

10 parts of this condensation product are boiled with 7 parts of 2.8-diamino-anthraquinone and 500 parts of nitrobenzene, the mass is then cooled down to 100° C. and 20 parts of glacial acetic acid are added thereto; the boiling of the whole is then continued for 1 hour in the vessel provided with a reflux cooler. The mass is filtered hot and the residue is dried, after having been washed previously with alcohol and water. The new dyestuff thus obtained constitutes a brownish red powder which dissolves difficultly in nitrobenzene to a red solution. It dissolves in fuming sulfuric acid and in sulfuric acid to a green coloration giving, when diluted with water, a red flocky precipitate. The new dyestuff gives with hydrosulfite and caustic soda a red-brown vat by means of which cotton can be dyed Bordeaux-red tints of excellent fastness.

Example 2.

A mixture of 14 parts of 3-bromo-beta-naphthoquinone, 12 parts of alpha-aminoanthraquinone, 8 parts of anhydrous sodium acetate, ¼ part of copper chloride and 200 parts of glacial acetic acid is boiled for 6 hours in a vessel provided with a reflux cooler. After cooling the mass is filtered. The residue is washed copiously with hot water and dried. There is thus obtained a brown powder of crystalline appearance which dissolves difficultly in toluene and xylene, more easily in nitrobenzene. From its solution in nitrobenzene the product can be crystallized in form of fine, brown-red needles. It dissolves in concentrated sulfuric acid to a yellow-brown solution; when this solution is diluted with water, there is obtained a flocky red precipitate. The product gives with hydrosulfite and caustic soda a red vat showing a very feeble affinity for cotton.

By reacting with this product on 2.3-diaminoanthraquinone in the manner described in the foregoing example there is obtained a new dyestuff constituting in a dry state, a red powder which dissolves rather difficultly in hot nitrobenzene and more easily in concentrated sulfuric acid with green coloration. It gives with hydrosulfite and caustic soda, a red-brown vat by means of which cotton can be dyed red-Bordeaux tints of excellent fastness.

The following tabular exhibits shows the composition and the properties of some dyestuffs of our invention, which are all red powders:

| First component. | Second component. | Third component. | Coloration of the solution of the dyestuff in sulfuric acid. | Coloration of the vat obtained with the dyestuff. | Tints obtained with the dyestuff on cotton. |
|---|---|---|---|---|---|
| Beta-naphthoquinone-4-sulfonic acid 1 mol. | Alpha-amino-anthraquinone 1 mol. | 1.2. diamino-anthraquinone 1 mol. | Green | Red-brown | Bluish Bordeaux. |
| ditto | 1-amino-4-methoxy-anthraquinone 1 mol. | ditto | ditto | ditto | Violet. |
| ditto | ditto | 2.3-diaminoanthraquinone 1 mol. | ditto | ditto | Heliotrope. |
| ditto | 1-amino-6-chlor-anthraquinone 1 mol. | ditto | ditto | ditto | Bordeaux. |
| 6-bromo-beta-naphthoquinone 1 mol. | Alpha-amino-anthraquinone 1 mol. | ditto | Olive green | ditto | Red. |
| ditto | ditto | 1.2. diamino-anthraquinone 1 mol. | ditto | ditto | Bluish Bordeaux. |
| Beta-naphthoquinone-4-sulfonic acid 2 mol. | 1.5-diamino-anthraquinone 1 mol. | 2.3-diamino-anthraquinone 2 mol. | Green | ditto | Ditto. |
| 3-bromo-beta-naphthoquinone 2 mol. | ditto | ditto | ditto | ditto | Bluish red. |

The 6-bromo-beta-naphthoquinone used as parent material for the preparation of certain dyestuffs of the tabular exhibit can be prepared easily by applying the method of transforming 1-bromo-betanaphthol into betanaphthoquinone, described in Justus Liebig's Annalen der Chemie, vol. 389, pages 315 to 317, to the 1-6-dibromo-beta-naphthol melting at 106° mentioned in the "Berichte der deutschen chemischen Gesellschaft" No. 24, vol. 3, page 705.

What we claim is:

1. The herein described process for the manufacture of new vat dyestuffs consisting in condensing first a derivative of beta-naphthoquinone containing removable substituents with an alphaaminoanthraquinone compound and in condensing afterwards the resulting product of condensation with an orthodiaminoanthraquinone.

2. The herein described process for the manufacture of new vat dyestuffs consisting in condensing first a derivative of beta-naphthoquinone containing removable substituents with a monoalphaaminoanthraquinone and in condensing afterwards the resulting product of condensation with an orthodiaminoanthraquinone.

3. The herein described process for the manufacture of new vat dyestuffs consisting in condensing first a derivative of beta-naphthoquinone containing removable substituents with a monoalphaaminoanthraquinone and in condensing afterwards the resulting product of condensation with 2.3-diaminoanthraquinone.

4. The herein described process for the manufacture of new vat dyestuffs consisting in condensing first a derivative of betanaphthoquinone containing removable substituents with alphaaminoanthraquinone and in condensing afterwards the resulting product of condensation with 2.3-diaminoanthraquinone.

5. The herein described process for the manufacture of new vat dyestuffs consisting in condensing first a betanaphthoquinone-4-sulfonic acid with alphaaminoanthraquinone and in condensing afterwards the resulting product of condensation with 2.3-diaminoanthraquinone.

6. The herein described new vat dyestuffs resulting from the action of a diaminoanthraquinone on the product of condensation of a betanaphthoquinone containing removable substituents with an alphaaminoanthraquinone and whose constitution is characterized by the presence of at least one anthraquinone-alphabeta-naphthazine complex united by a >N—H group to an anthraquinone nucleus which may bear other substituents, one of the nitrogen valences of the >N—H groups being fixed in any position of the naphthalene nucleus of the anthraquinone-alphabeta-naphthazines and the other in alphaposition of the anthraquinone nucleus, the said dyestuffs being, in a dry state, red powders more or less brownish, soluble in sulfuric acid to green solutions and giving with dilute caustic soda and hydrosulfite brown-red vats by means of which cotton can be dyed red to violet tints.

7. The herein described new vat dyestuffs resulting from the action of a diaminoanthraquinone on the product of condensation of a betanaphthoquinone containing removable substituents with a monoalphaaminoanthraquinone and whose constitution is characterized by the presence of an anthraquinone-alphabeta-naphthazine complex united by a >N—H group to an anthroquinone nucleus which may bear other substituents, one of the nitrogen valences of the >N—H group being fixed in any position of the naphthalene nucleus of the anthraquinone-alphabeta-naphthazine and the other in alphaposition of the anthraquinone nucleus, the said dyestuffs being, in a dry state, red powders more or less brownish, soluble in sulfuric acid to green solutions and giving with dilute caustic soda and hydrosulfite brown-red vats by means of which cotton can be dyed red to violet tints.

8. The herein described new vat dyestuffs resulting from the action of a 2.3-diaminoanthraquinone on the product of condensation of a betanaphthoquinone containing removable substituents with a monoalphaaminoanthraquinone and whose constitution is characterized by the presence of an anthraquinone-alphabeta-naphthazine complex united by a >N—H group to an anthraquinone nucleus which may bear other substituents, one of the nitrogen valences of the >N—H group being fixed in any position of the naphthalene nucleus of the anthraquinone-alphabeta-naphthazine and the other in alphaposition of the anthraquinone nucleus, the said dyestuffs being, in a dry state, red powders more or less brownish, soluble in sulfuric acid to green solutions and giving with dilute caustic soda and hydrosulfite brown-red vats by means of which cotton can be dyed red to violet tints.

9. The herein described new vat dyestuffs resulting from the action of 2.3-diaminoanthraquinone on the product of condensation of a betanaphthoquinone containing removable substituents with the monoalphaaminoanthraquinones and whose constitution is characterized by the presence of an anthraquinone-alphabeta-naphthazine complex united by a >N—H group to an anthraquinone nucleus which may bear other substituents, one of the nitrogen valences of the >N—H group being fixed in any position of the naphthalene nucleus of the anthraquinone-alphabeta-naphthazine and the other in alphaposition of the anthraquinone nucleus, the said dyestuffs being, in a dry state, red powders more or less brownish, soluble in sulfuric acid to green solutions and giving with dilute caustic soda and hydrosulfite brown-red vats by means of which cotton can be dyed red to violet tints.

10. The herein described new vat dyestuffs resulting from the action of 2.3-diaminoanthraquinone on the product of condensation of betanaphthoquinone-4-sulfonic acid with the monoalphaaminoanthraquinones and whose constitution is characterized by the presence of an anthraquinone-alphabeta-naphthazine complex united by a >N—H group to an anthraquinone nucleus which may bear other substituents, one of the nitrogen valences of the >N—H group being fixed in the 4-position of the naphthalene nucleus of the anthraquinone-alphabeta-napthazine and the other in alphaposition of the anthraquinone nucleus, the said dyestuffs being, in a dry state, red powders more or less brownish, soluble in sulfuric acid to green solutions and giving with dilute caustic soda and hydrosulfite brown-red vats by means of which cotton can be dyed red to violet tints.

11. As a new article of manufacture the herein described vat dyestuff resulting from the action of 2.3-diaminoanthraquinone on the product of condensation of betanaphthoquinone-4-sulfonic acid with alpha-aminoanthraquinone and whose constitution is characterized by the presence of one anthraquinone - alphabeta - naphthazine complex united by a >N—H group to an anthraquinone nucleus, one of the valence of the nitrogen group >N—H being fixed in a 4-position of the naphthalene nucleus of the anthraquinone - alpha - beta - napthazine and the other in an alpha-position of the anthraquinone nucleus, the said dyestuff being in a dry state a red powder, soluble in sulfuric acid to a green solution and giving with caustic soda and hydosulfite a brown-red vat by means of which cotton can be dyed Bordeaux tints.

In witness whereof we have hereunto signed our names this 13th day of January, 1922, in the presence of two subscribing witnesses.

BERTRAM MAYER.
WILHELM MOSER.
JAKOB WÜRGLER

Witnesses:
 FRIDK. RUSS,
 AMAND RITTER.